United States Patent [19]
Tindell

[11] Patent Number: 5,904,320
[45] Date of Patent: May 18, 1999

[54] BLOCKERLESS THRUST REVERSER

[75] Inventor: Runyon H. Tindell, Old Bethpage, N.Y., 11714

[73] Assignee: Northrop Gunman Corporation, Los Angeles, Calif.

[21] Appl. No.: 08/900,255

[22] Filed: Jul. 25, 1997

Related U.S. Application Data

[63] Continuation-in-part of application No. 08/570,421, Dec. 11, 1995, Pat. No. 5,713,537, and a continuation of application No. 08/274,900, Jul. 14, 1994, abandoned.

[51] Int. Cl.⁶ .................................................. F02K 3/02
[52] U.S. Cl. ............................ 244/110 B; 239/265.17; 60/226.2
[58] Field of Search .................. 244/110 B; 239/265.17; 60/226.2, 230

[56] References Cited

U.S. PATENT DOCUMENTS

| | | | |
|---|---|---|---|
| 3,024,602 | 3/1962 | Bertin et al. | 239/265.17 |
| 4,073,440 | 2/1978 | Hapke | 60/226.2 |
| 5,090,196 | 2/1992 | Balzer | 60/226.2 |
| 5,315,821 | 5/1994 | Dunbar et al. | 60/226.2 |

FOREIGN PATENT DOCUMENTS

| | | | |
|---|---|---|---|
| 669492 | 8/1963 | Canada | 239/265.17 |
| 1030483 | 6/1953 | France | 239/265.17 |

OTHER PUBLICATIONS

The American Heritage Dictionary, Second College Edition, Houghton Mifflin Co., p. 857, 1982.

*Primary Examiner*—Galen L. Barefoot
*Attorney, Agent, or Firm*—Terry J. Anderson; Karl J. Hoch, Jr.

[57] ABSTRACT

A blockerless thrust reverser for an aircraft having a podded nacelle housing a turbofan engine which produces core flow and a fan exit stream. Reverse thrust is obtained by diverting the fan exit stream into an annular slot formed in an outer wall of the nacelle where it is turned and discharged forwardly. The fan exit stream is directed into the annular slot by injecting high pressure streams of core flow into the fan exit stream at positions which are upstream of and adjacent to the annular slot. Reverse thrust is selectively obtained by a control means which selectively opens and closes the annular slot and the core jet injectors.

11 Claims, 7 Drawing Sheets

BLOCKERLESS THRUST REVERSER

This patent application is a continuation-in-part application of parent application Ser. No. 08/570,421, filed Dec. 11, 1995, now U.S. Pat. No. 5,713,537 which is a continuation application of parent application Ser. No. 08/274,900, filed Jul. 14, 1994.

BACKGROUND OF THE INVENTION

1. Field of the Invention

The present invention relates generally to a thrust reverser, and more particularly, pertains to a blockerless thrust reverser for an aircraft having a podded nacelle housing a turbo-fan engine.

2. Description of the Prior Art

Existing thrust reversers require a mechanical blocker device to divert the normally aft-flowing fan stream and turn it outward prior to being discharged from the aircraft in a forward direction. The blocker sustains very large loads, is heavy, and the associated mechanisms incur stowage, maintenance, internal performance and reliability penalties. Thrust reversing is typically accomplished by deploying large clamshell-like or segmented annular doors to block the fan flow turning it outward and forward, possibly assisted by guide vanes. These load-bearing surfaces are heavy, incur a high parts count due to variable positioning and stowage, and cause performance penalties during stowed operation due to total pressure and leakage losses. Although the thrust reverser system is used for only a fraction of the airplane operating time, its impact on nacelle design, weight, airplane cruise performance, engine maintenance and aircraft operating expense is significant.

An engine company study indicates that a thrust reverser system accounts for more than 30 percent of total nacelle weight (not including the engine) for an engine with a fan diameter greater than 100 in. This can be as much as 1,500 lb for a GE90 class engine. Estimated thrust reverser weight is on the order of 55 percent of total nacelle weight for a Folker F100 or Gulfstream GV type installation. This accounts for approximately 600 to 800 lbs. of the nacelle weight. In addition, due to leakage and pressure drops attributed to thrust reverser mechanisms, thrust reverser systems have been estimated to increase specific fuel consumption (SFC) by 0.5 to 1.0 percent. This significantly increases the cost of doing business for commercial operators.

High by-pass ratio engines installed on aircraft such as the 737, 747, 767, 777, DC10, MD11 and A300 use fan stream cascade vane thrust reversers which reverse the fan stream to provide reverse thrust. Generally, core flow is not reversed, due to the complexities and unreliability associated with reversing the core flow. The reversed fan stream provides sufficient reverse thrust in most cases.

The fan stream thrust reverser consists of a series of cascade vanes located around the periphery of the fan cowling aft of the fan exit guide vanes. A series of blocker doors isolates the cascade vanes from the fan stream in forward thrust, while a translating cowl covers the external surface of the cascade vanes, providing a smooth exterior surface for low drag. On actuation, a mechanical drive system translates the outer cowling aft, exposing the cascade vanes external surfaces, while at the same time pivoting the internal blocker door aft on links attached to the core cowling, blocking the fan flow and reversing it through the cascade vanes. With the thrust reverser stowed, engine performance penalties result from leakage round the stowed blocker doors, as well as scrubbing drag associated with blocker door actuating links.

A fixed pivot thrust reverser is used with engines that incorporate a compound nozzle exhaust system, that is, a single nozzle for combined core and fan flow. This type of reverser is used on executive and small commercial aircraft, such as the Falcon 10/20/30, Saberliner, Gulfstream GIV Executive and Folker F100/F70 Regionaliner. The fixed pivot thrust reverser consists of two target doors that are integral with the nacelle aft cowl assembly. The stowed reverser forms the external boattail of the nacelle and also the internal shape of the exhaust nozzle. Internal joints of the stowed reverser nozzle employ seals to minimize leakage in a forward thrust mode. For operation in a reverse mode, the reverser doors pivot aft to form a target that blocks and turns the combined core and fan flow to produce the desired reverser reaction force. The target is located far enough behind the jet-pipe exit to minimize suppression (back pressure) of the engine turbine exhaust and fan flows. The doors generally include end plates to assist in turning the reversed flow. Pivoting of the doors between the stowed and deployed positions is by means of a pushrod to each door driven by a single bellcrank idler that keeps the door motions synchronized. The bellcrank is powered by a hydraulic actuator.

Mechanical blockers employed by known thrust reversers cause in-flight engine performance penalties because they are heavy in weight, require stowage which increases nacelle drag, and cause pressure losses to the fan flow due to inefficient seals between the blockers and the main body. In addition, mechanical blockers sustain very large loads and have a high parts count which decreases reliability and increases the need for maintenance. Thus, thrust reversers employing mechanical blockers cause significant increases to operating and maintenance costs of an aircraft.

French Patent 1,030,483, 1953, is directed to a general application of a blowing jet to turn a large stream radially outwardly, into a cascade of vanes. This patent mentions directionality of the jet (slightly forward, normal to stream, slightly aft). The Figure and text describes a device that cannot be integrated into a modern turbofan engine. The jet configuration described requires more compressor bleed flow than is possible. This patent does not mention any other design characteristics, and does not mention anything about vane cascade design.

Canadian Patent 669,492, 1963, applies the blowing jet concept of the French Patent, but adds an aft-translated cowl (transcowl) to restrict downstream nozzle flow. This assists the jet in turning the large stream into a vane cascade, and is a restriction to the generality. This patent does not mention anything about vane cascade design.

SUMMARY OF THE INVENTION

The present invention is directed to a blockerless thrust reverser for an aircraft having a podded nacelle housing a turbo-fan engine which produces a core flow and a fan exit stream. Reverse thrust is obtained by discharging the fan exit stream out of an annular slot formed in an outer wall of the nacelle. The fan exit stream is directed into the annular slot by means of annular core jet injectors which inject high pressure streams of core flow into the fan exit stream.

The present invention utilizes a blowing jet to turn a large stream radially outwardly into a vane cascade, but the jet is particularly designed to be integrated into and operable with modern turbofan engines, i.e., a viable compressor bleed amount and a small length of vane cascade.

Some embodiments of the present invention utilize a Coanda surface to turn the fan exit stream into the annular slot. A Coanda surface is a geometric structure with a shape defined by a mathematical curve called a lemniscate. A fluid stream flowing over a Coanda surface tends to adhere to that surface, therefore, relatively separation-free turning of the fluid stream can be accomplished. Implementing a Coanda surface at the forward convex surface of the annular slot will help the fan exit stream turn into the annular slot.

The present invention is also directed to a method of thrust reversing an aircraft having a podded nacelle housing a turbo-fan engine producing a fan exit stream without the use of mechanical blockers. The first step is to form an annular slot in an outside wall of the nacelle. Next, the fan exit stream is directed into the annular slot by injecting high pressure streams of core flow into the fan exit stream upstream of and adjacent to the annular slot. Finally, the fan exit stream is discharged out of the annular slot in a forward direction.

The principle object of the present invention is to provide a thrust reverser for an aircraft which does not utilize mechanical blockers.

Another object of the present invention is to provide a thrust reverser which reduces in-flight engine performance losses that are present in known thrust reversers. In the present invention, in-flight fan thrust is increased and specific fuel consumption (SFC) is reduced by reducing total pressure losses and leakage associated with stowage of mechanical blockers.

Another object of the present invention is to provide a thrust reverser which has a simpler structure than known prior art thrust reversers. The structure is lighter in weight, has a low parts count, requires no stowage, and is more efficiently packaged in the nacelle.

A further object of the present invention is to provide a thrust reverser which is more reliable than known thrust reversers. In the present invention, there are no parts which are deployed directly into the path of the fan exit stream, thus the parts do not sustain large loads. Small loads reduce the possibility of part failures and, therefore, increase reliability. In addition, the lower parts count increases reliability.

A further object of the present invention is to provide a thrust reverser which is more cost efficient than known thrust reversers. The present invention is more cost efficient than known thrust reversers because SFC is reduced due to lower fan thrust loss and lower nacelle weight. Reduced SFC significantly reduces the cost of aircraft operation. In addition, the simple structure and low parts count of the present invention reduces costs in manufacturing and maintaining the engine.

In accordance with the teachings herein, the present invention provides a thrust reverser for an aircraft which does not utilize mechanical blockers. The aircraft includes a podded nacelle having a fan nacelle and a core nacelle, positioned symmetrically about a longitudinal axis, and housing a turbofan engine producing a core flow and a fan exit stream. An annular slot is formed through an outer wall of the fan nacelle for turning forward and discharging the fan exit stream and part of the core flow. The annular slot has a forward convex surface and an aft concave surface connecting an inner exterior surface to an outer exterior surface of the outer wall. A core jet injector is housed in the core nacelle for injecting part of the core flow into the fan exit stream, thereby deflecting the fan exit stream and part of the core flow into the annular slot. In accordance with the teachings herein, the core jet injector is positioned at an angular position (ø) of less than 45° relative to the longitudinal axis, and faces upstream relative to the fan exit stream, to provide efficient deflection of the fan exit stream. A control system selectively opens and closes the core jet injector to provide selective thrust reversal.

In greater detail, the core jet injector is positioned within the length of the annular slot along the longitudinal axis. The core jet injector is preferably positioned adjacent to the upstream edge of the annular slot, consistent with the convex forward surface, whereby the fan exit stream directed into the annular slot is turned forward and discharged therefrom. In one embodiment, the angular position (ø) is at substantially 35° relative to the longitudinal axis. The ratio (t/h) of the jet thickness (t) to the annular height (h) of the fan duct is within the range of 0.015 to 0.035.

The turbofan engine is of a modern design having a bypass ratio of flow through the fan to flow through the core of 3.00 or greater. The maximum value of the ratio of injector flow to total core flow of $W_{inj}/W_{fan}$ is 0.15, representative of modern engines.

The control system selectively moves a cover, moveably mounted in the outer wall, to selectively open and close the annular slot. The control system simultaneously opens the cover and the core jet injector, thereby injecting part of the core flow into the fan exit stream and deflecting the fan exit stream and part of the core flow into the annular slot. A cascade of turning vanes is mounted within the annular slot, aligned in a direction consistent with the convex forward surface, whereby the fan exit stream directed into the annular slot is turned forward and discharged by the cascade of vanes.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENT

Figure 1:
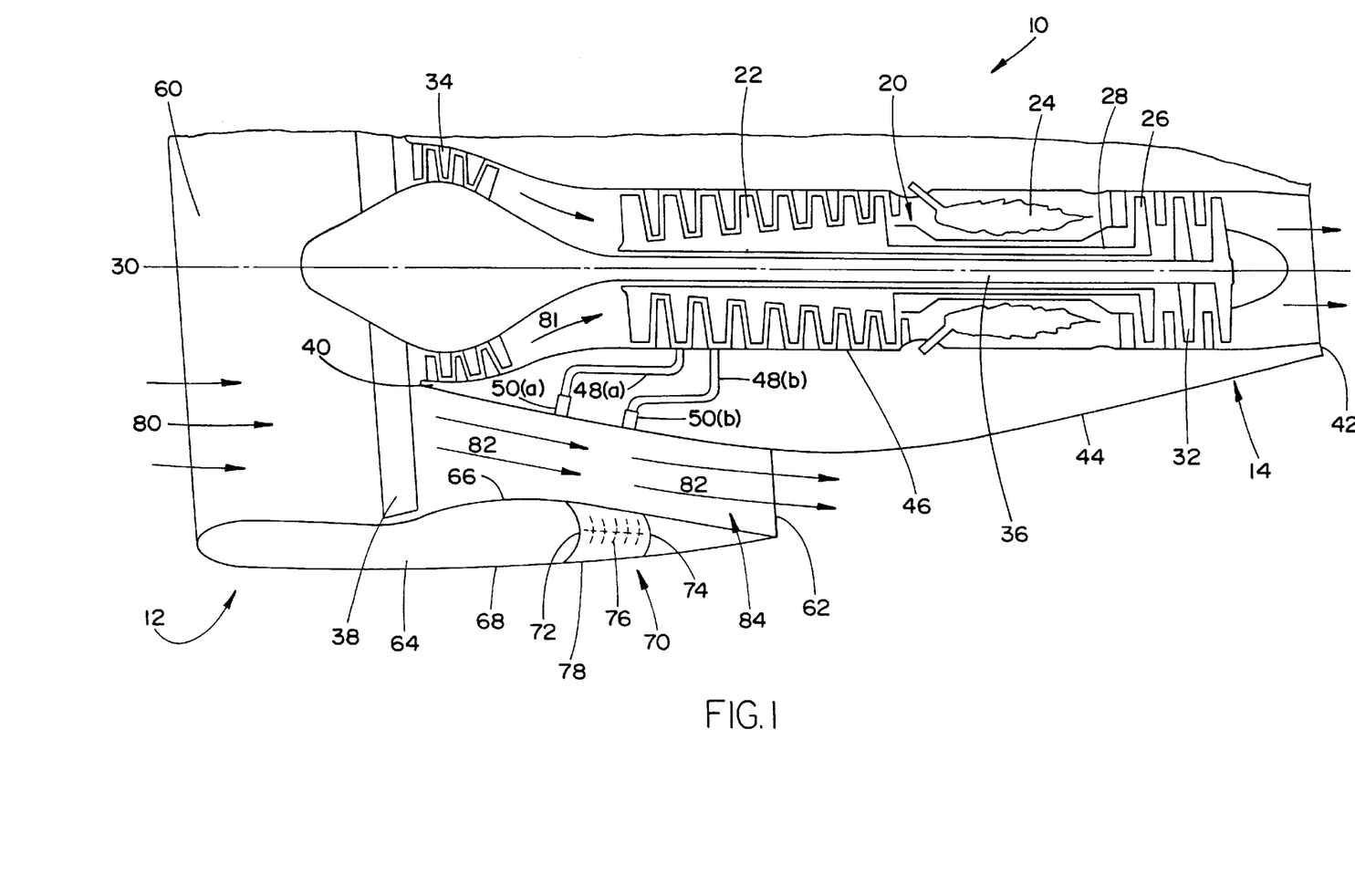
FIG. 1 shows a first embodiment of the present invention in a forward thrust mode.
Figure 2:
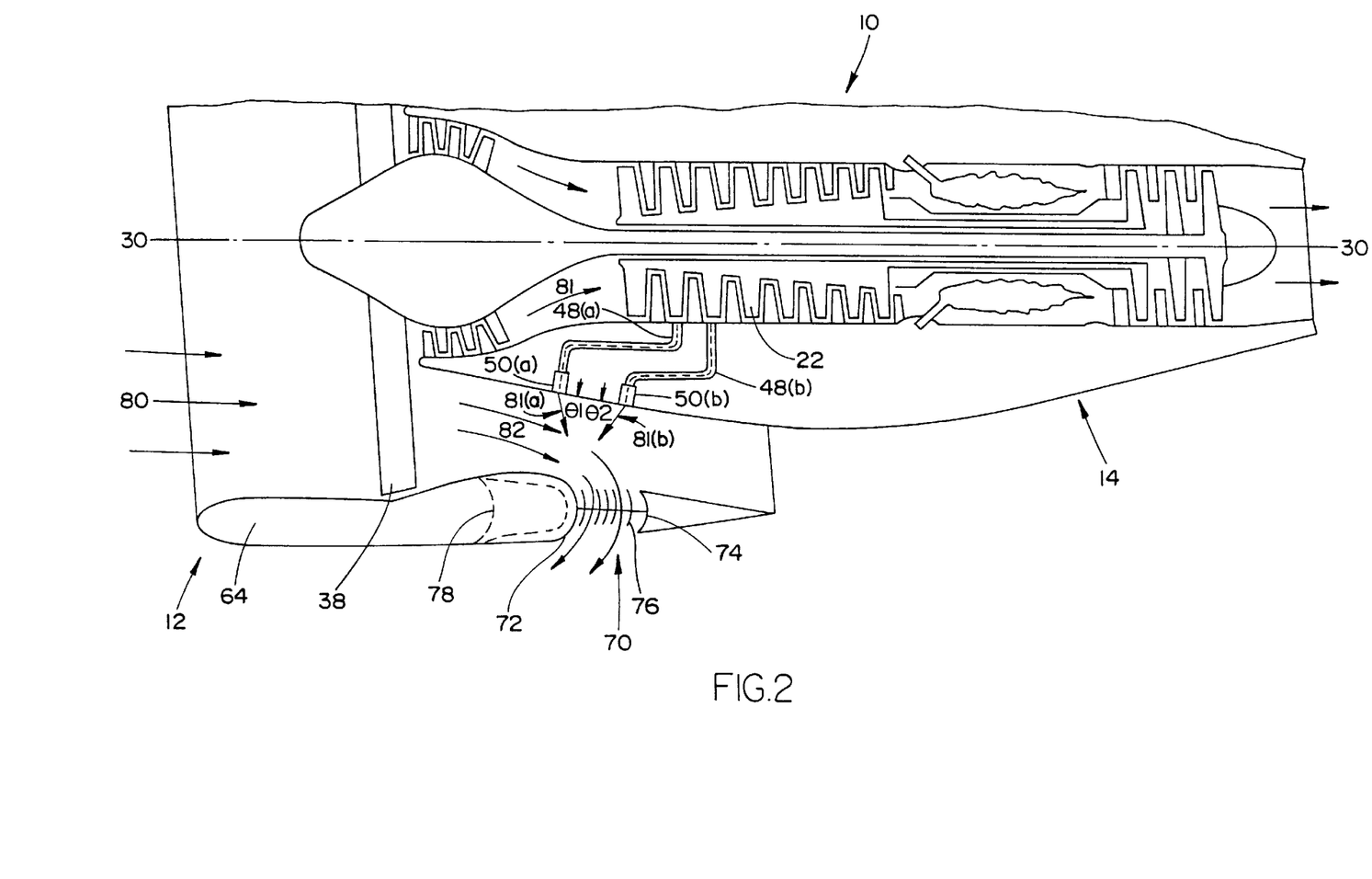
FIG. 2 shows the first embodiment of the present invention in a reverse thrust mode.

FIGS. 1 and 2 show a first embodiment of the present invention as implemented in an aircraft having a turbofan engine 10 housed in a podded nacelle comprising a fan nacelle 12 and a core nacelle 14.

The core nacelle 14 houses a core engine 20 comprising, a high pressure compressor 22, a combustor 24 and a high pressure turbine 26 all arranged in a serial, axial flow relationship. A larger diameter annular drive shaft 28, disposed coaxially about a centerline 30 of the turbofan engine 10, fixedly interconnects the high pressure compressor 22 and the high pressure turbine 26.

The core nacelle 14 further houses a low pressure turbine 32 and a low pressure compressor 34 called a booster. Both the low pressure turbine 32 and the low pressure compressor 34 are fixedly attached to a smaller diameter annular drive shaft 36 which is disposed coaxially about the centerline 30 of the engine 10 within the larger diameter annular drive shaft 28. A fan 38 including a row of generally radially outwardly extending fan rotor blades (not shown) is fixedly attached to the smaller diameter annular drive shaft 36.

The core engine 20, the low pressure turbine 32 and the low pressure compressor 34 are surrounded by the core nacelle 14 which supports the drive shafts 28 and 36 by bearings (not shown). The core nacelle 14 is disposed longitudinally aft of the fan 38 and has a longitudinally forward end defining a flow splitter 40 and a longitudinally aft end defining a core nozzle 42. The core nacelle 14 has an outer core surface 44 facing generally radially outward and an inner core surface 46 integrally surrounding the core engine 20, the low pressure turbine 32 and the low pressure compressor 34. Two passageways, 48(a) and 48(b), are formed through the core nacelle 14 from the inner core surface 46 to the outer core surface 44 connecting the high pressure compressor 22 to a first core jet injector 50(a) and a second core jet injector 50(b). Core jet injectors 50(a) and 50(b) are primarily annular in shape and have a nozzle control (not shown) which can selectively open and close injectors 50(a) and 50(b).

The fan nacelle 12 circumferentially surrounds the fan 38 and at least a portion of the core nacelle 14. The fan nacelle 12 is supported about the core nacelle by a plurality of support members (not shown). The fan nacelle 12 has a longitudinally forward end defining an ambient air intake 60, a longitudinally aft end defining a fan nozzle 62, and an outer wall 64 including an inner exterior surface 66 facing generally radially inward and an outer exterior surface 68 facing generally radially outward. An annular slot 70 is formed through the outer wall 64 of the fan nacelle 12 connecting the surfaces 66 and 68. The annular slot 70 has a convex forward surface 72 and a concave aft surface 74. A series of turning vanes 76 are positioned within the annular slot 70. The convex forward surface 72 is a Coanda surface defined by a mathematical curve called a lemniscate which supports loss free turning of fluid streams through large angles. The annular slot 70 has a movable cover 78 which when deployed, as in FIG. 1, closes the annular slot 70 and covers the turning vanes 76. The cover 78, when retracted as in FIG. 2, is housed within the outer wall 64 of the fan nacelle 12.

The core engine 20 generates combustion gases. Pressurized gas from the high pressure compressor 22 is mixed with fuel in the combustor 24 and ignited, thereby generating combustion gases. Some energy is extracted from these gases by the high pressure turbine 26 which drives the high pressure compressor 22. The remainder of the combustion gases are discharged from the core engine 20 into the low pressure turbine 32 which rotates the smaller diameter drive shaft 36 and the fan 38. After flowing through the high pressure turbine 26 and the low pressure turbine 32 the combustion gases are discharged out of the core nozzle 42 in an aft flowing direction.

FIG. 1 shows the turbofan engine 10 as it operates in forward thrust mode. The movable cover 78 is deployed thereby closing the annular slot 70, and core jet injectors 50(a) and 50(b) are closed. The combustion gases generated by the core engine 20 rotate the low pressure turbine 32 which rotates the fan 38 thereby drawing ambient air 80 into the ambient air intake 60. The ambient air 80 is drawn through the fan 38 toward the flow splitter 40 which directs some of the air, called the core flow 81, into the core engine 20. The remaining air, called the fan exit stream 82, is directed into a flow path 84 located between the outer core surface 44 of the core nacelle 14, and inner exterior surface 66 of the outer wall 64 of the fan nacelle 12. The aft flowing fan exit stream 82 flows through the flow path 84, over the cover 78 covering the annular slot 70 and is then discharged out of the fan nozzle 62 in an aft flowing direction thereby creating forward thrust.

In addition, core flow 81 is directed into core engine 20, where it is compressed, mixed with fuel and ignited thereby creating combustion gases that exit through the core nozzle 42 and generate additional forward thrust.

FIG. 2 shows the turbofan engine 10 in reverse thrust mode. The cover 78 is retracted into the outer wall 64 of the fan nacelle 12 thereby opening the annular slot 70 and exposing the turning vanes 76. Core jet injectors 50(a) and 50(b) are open, therefore, two high pressure streams of core flow, 81(a) and 81(b), are extracted from the high pressure compressor 22 and are directed through passageways 48(a) and 48(b) to injectors 50(a) and 50(b) where they are injected into the fan exit stream 82 at angles θ1 and θ2. The first core jet injector 50(a) is positioned upstream of the annular slot 70 and its high pressure stream of core flow 81(a) forces most of the fan exit stream 82 toward the annular slot 70. The second core jet injector 50(b) is positioned directly across from the annular slot 70 and its high pressure stream of core flow 81(b) supplements high pressure stream 81(a) and forces most of the fan exit stream 82 into the annular slot 70.

The fan exit stream 82 flowing over the convex Coanda surface 72 tends to adhere to the Coanda surface 72 and turn into the annular slot 70. Thus, the Coanda surface 72 helps core jets 50 and 52 direct the fan exit stream 82 into the annular slot 70.

When the fan exit stream 82 enters the annular slot 70 it is turned forward by the turning vanes 76 and the concave aft surface 74. The fan exit stream 82 is then discharged out of the annular slot 70 in a forward direction thereby generating reverse thrust.

There is a need for more efficient packaging of stowed thrust reversers, which presently can cause in excess of 0.5%–1% in fuel consumption penalty to turbofan engine-powered transport aircraft, due to leakage and fan duct pressure loss. The penalty stems from the leakage across the blocker doors, which are stowed flush in the outer surface of the fan exhaust duct, and the pressure drop across the blocker door-to-actuator links, which span the annular fan duct.

The concept of the present invention for eliminating this aircraft performance penalty is to replace the entire blocker door arrangement with a fluidic approach, i.e., a blockerless engine thrust reverser (BETR). In this arrangement, a small amount of high pressure airflow from the turbofan core compressor is injected into the fan exhaust stream, causing it to turn radially outwardly into the annular cascade opening.

Figure 3:
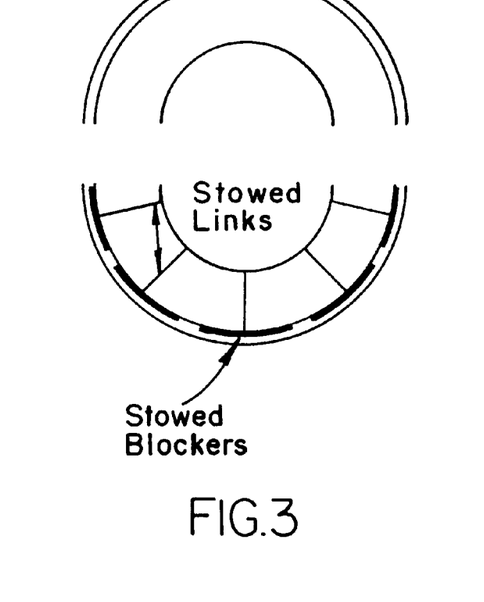
FIG. 3 illustrates forward elevational views of a conventional stowed thrust reverser, shown in the lower half thereof with stowed links and blockers, compared with the fluidic approach of the present invention, shown in the upper half thereof when the reverser is stowed.

FIG. 3 illustrates forward elevational views of a conventional stowed thrust reverser, shown in the lower half thereof with stowed links and blockers, compared with the fluidic approach of the present invention, shown in the upper half thereof, when the reverser is stowed. The upper half of FIG. 3 shows the cleaner nozzle duct achieved by the present invention for up and away flight, which can provide significantly reduced fuel consumption. The injected flow is frequently described as a fraction of the fan discharge (upstream) flow, i.e., $W_{inj}/W_{fan}$, and is denoted as the injection mass flow ratio. The vanes then cause the turned flow to bend forward to produce reverse thrust, as is done in typical blocker door designs.

A similar fluidic approach has been described in previous prior art patents Canadian Patent 669,492 and French Patent 1,030,488, with the descriptions therein being in rather general terms. The direction of their injected flow, for example, is defined to be perpendicular to the main stream or slightly forward or aft of perpendicular. Research on the present invention has shown that those orientations will not allow application of their concepts to modern turbofan engine installations. When applied to the broad population of modern engines powering turbofans today and over the next 10–15 years, i.e., engines with bypass ratios in excess of BPR=3, these previously patented ideas do not provide the benefits they have sought. This limitation stems from the inability of high bypass ratio engines to provide the large injection flows required by these prior art approaches.

The problem is that, because the maximum flow that may be bled from a typical core compressor is a small percentage of the total core flow, and the total core flow is a small percentage of the fan flow, the maximum allowable ratio of core bleed (for injected flow) to fan flow (bypass ratio (BPR) $W_{core}/W_{fan}$) can be extremely small. In fact, research on the present invention has shown that the typical modern turbofan core cannot provide more bleed flow than approximately 20% ($W_{max\,inj}/W_{core}=0.20$), with larger bleeds causing marginal core engine operation. (smaller bleed percentages are frequently quoted in engine specifications).

The important relationship defining the maximum engine bypass ratio that can provide a required injector mass flow ratio is:

$$BPR_{max}=(W_{max\,inj}/W_{core})/(W_{inj}/W_{fan})$$

This means that a fluidic thrust reverser for an engine having BPR=4, as an example of the near-lowest BPR of modern flying turbofans, cannot inject more than $W_{inj}/W_{fan}=0.05$. The next-generation turbofans, having approximately BPR=8, will not be capable of an injection flow ratio more than $W_{inj}/W_{fan}=0.025$. Research on the present invention illustrates that the fluidic reverser configurations described by the prior art require much larger injection flow ratios, and are therefor incompatible with modern turbofan engines. The problem relates to their inadequate injector nozzle design.

Thus far, fluidic reverser development efforts resulting in the present invention have shown, analytically and experimentally, that all the fan flow plus the injector flow can be turned into the cascade opening of a representative fan exhaust configuration with an injection mass flow ratio of $W_{inj}/W_{fan}=0.025$. This would accommodate engines with bypass ratios up to BPR=8, based on our previous assumption of a maximum core bleed of 20%.

Test results have demonstrated reverse thrust levels equal to 20%–50% of the forward thrust (reverser stowed) measurements, which is present state-of-the-art capability. Adequate reverse thrust levels for some applications may require less than all of the fan flow to be reversed. In these cases, less injected flow would be required, and therefore higher BPR engines could be accommodated. The fluidic reverser configuration required to achieve what the present invention has demonstrated thus far is a very specific arrangement of injector location, size, and direction, not known to the industry.

The following discussion introduces the basics of the fluidic reverser (BETR) research on the present invention, and defines the resultant specific reverser concept of the present invention.

Sub-Scale Research Model: Experimental evaluation of the fluidic reverser concept has employed an approximately 1/10th scale model having geometry that is generic to many reversers existing on modern aircraft. The test conditions simulated static aircraft operation across the range of engine power settings, with and without the reverser deployed. Accurate measurements have been made of simulated fan and injector flows, pressures along surfaces and across flow stations, and of axial forces.

Fluidic Thrust Reverser Basics: The fan flow deflection performance characteristics of a fluidic reverser may be described by the variation of fan flow that is caused to enter the cascade opening, $W_{cas}$, with the amount of core bleed flow injected, $W_{inj}$. Such performance characteristics is shown for representative test data in FIG. 4, where both flow rates have been normalized by the total fan discharge (upstream), flow, $W_{fsn}$.

Figure 5:
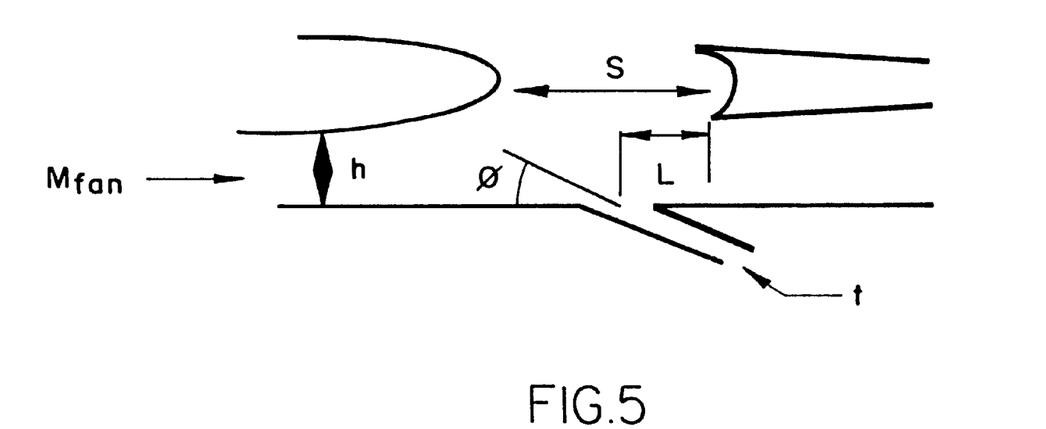
FIG. 5 illustrates the geometry of the configuration of the fluidic reverser, showing the cascade opening S, distance of the injector jet from the entrance to the nozzle duct L, angle of the injector jet ø, injector jet thickness t, and the fan duct annular height h.

The geometry of the configuration is illustrated in FIG. 5. Cascade opening, S, distance of the injector jet from entrance to nozzle duct, L, angle of the injector jet, ø, and injector jet thickness, t, are the primary geometric parameters, and in calculations herein are normalized by the fan duct annular height, h. Research on the present invention has shown that the jet thickness and is not a very significant parameter within the range $0.015<t/h<0.035$. Also the longitudinal position of the jet location, L, must be within the longitudinal length of the cascade opening, S.

Figure 4:
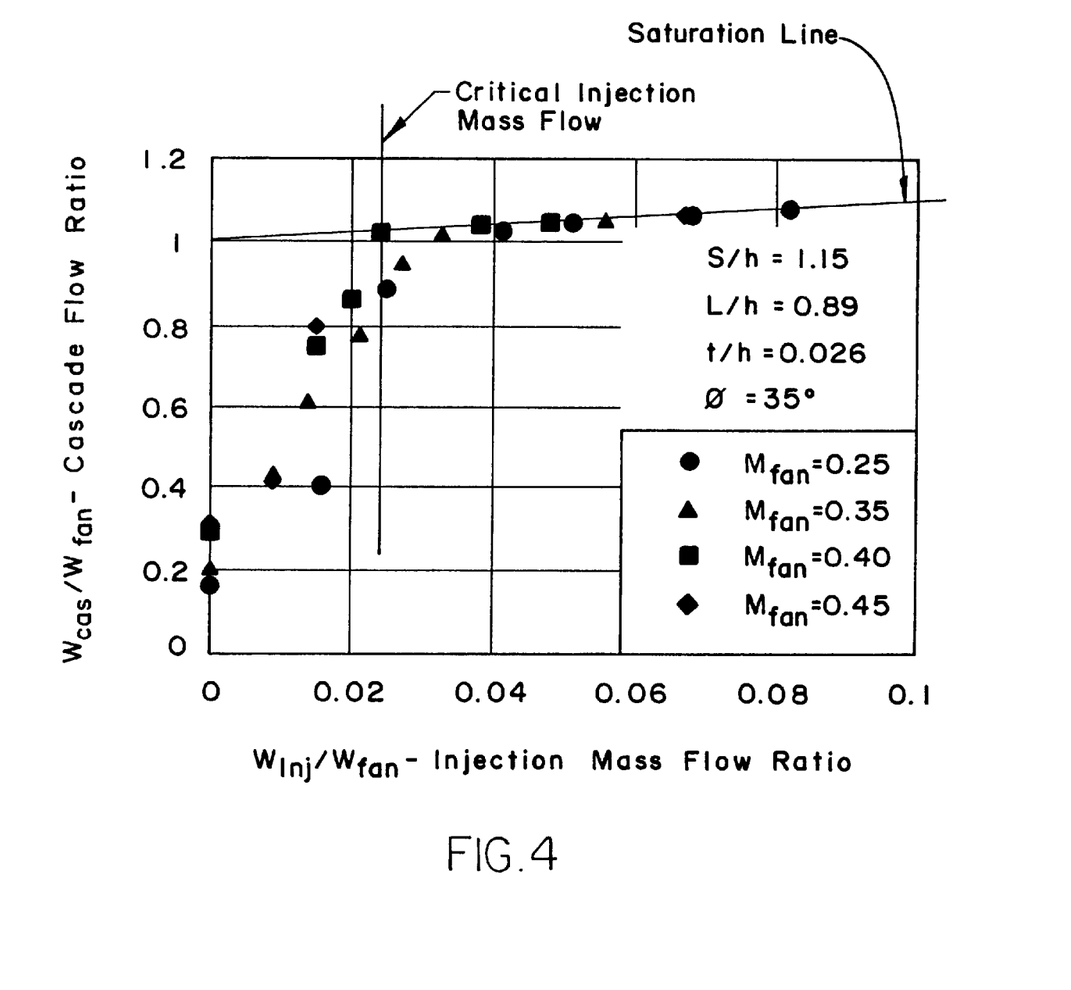
FIG. 4 illustrates representative test data on the fan flow deflection performance characteristics of a fluidic reverser, and shows the variation of fan flow $W_{fan}$ which is caused to enter the cascade opening, $W_{cas}$, with the amount of core bleed flow injected, $W_{inj}$.

The data plotted in FIG. 4 are four values of fan discharge Mach number, all of which are fairly closely grouped, implying that the differing values of discharge Mach number have no significant effect upon the cascade flow ratio $W_{cas}/W_{fan}$. The data show that initial increases of the injection mass flow ratio $W_{inj}/W_{fan}$ cause rapid increases in the cascade flow ratio, but an abrupt flattening out of the cascade flow ratio occurs at a "critical" value of the injection flow ratio at approximately 0.025. This critical value occurs when the cascade opening is initially saturated with 100% of the fan flow plus the injected core flow. Further increases in the injector core flow cause the cascade flow cause the cascade flow to increase along the saturated line. It is apparent from FIG. 4 that the most efficient performance, i.e., the point at which the ratio of cascade flow to injector flow is maximized, occurs at the critical point (this ratio at the critical point can be considered a Figure of Merit for different designs). Design of practical reversers, considering control system stability, etc., would probably be constrained to operate at, or slightly higher than, the critical value of $W_{inj}/W_{fan}$. Therefore the performance of various fluidic reverser geometries are compared at their critical points, particularly in FIG. 6.

Figure 6:
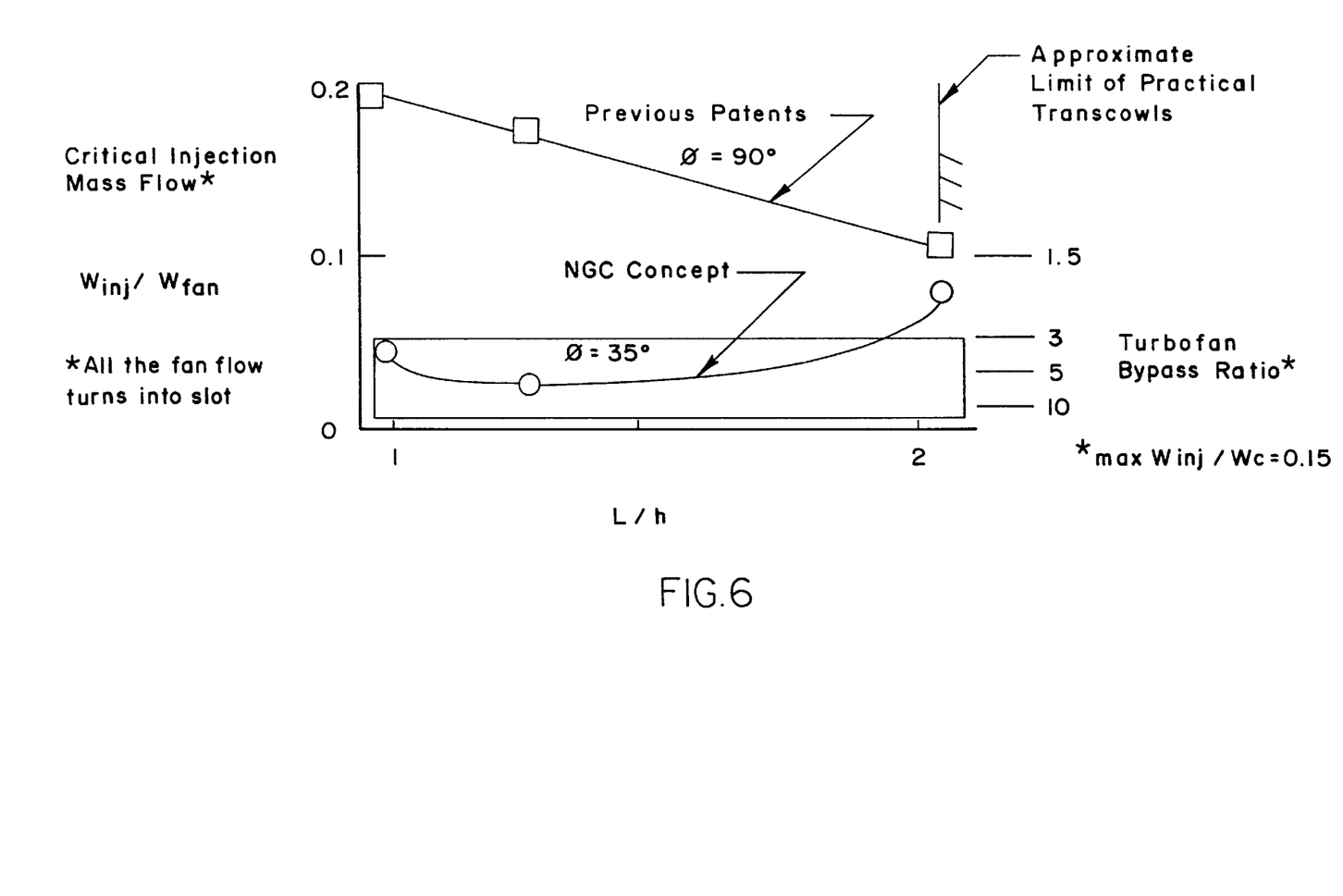
FIG. 6 illustrates a comparison of the critical injection mass flow ratios for two sets of data, wherein the upper curve is for ø=90° which corresponds to the disclosure of the prior art patents for fluidic thrust reversers, and the lower curve is for the BETR fluidic reverser concept of the present invention.

The Criticality of Injector Jet Angle: FIG. 6 illustrates a comparison of the critical injection mass flow ratios for two sets of data, corresponding to the configuration described in the upper right corner of FIG. 4. Also shown, by the right hand ordinate scale, are the maximum engine bypass ratios that correspond to the values of injection mass flow ratio. A maximum value of the ratio of injector flow to total core flow of $W_{inj}/W_{core}=0.15$ was used, as representative of modern engine capability.

The upper curve in FIG. 6, is for ø=90° which corresponds to the disclosure of the prior art patents for fluidic thrust reversers, i.e., "perpendicular to the axis of the engine", also "slightly inclined towards the front of the engine", in Canadian Patent 669,492, and, "perpendicularly into the flow", in French Patent 1,030,483. Testing of the model did not include transcowl openings larger than S/h=3, representing a practical limit to transcowl lengths which correspond to an L/h=2.1, as indicated by the right limit on FIG. 6. The ø=90° test results show that injection mass flow requirements do not get lower than $W_{inj}/W_{fan}=0.10$, within the range of practical cascade openings, i.e., L/h<2.1. Larger openings may achieve somewhat lower injection mass flow requirements, but would impose unacceptable large penalties to exhaust system weight and volume, impacting normal flight performance and operating costs. It is expected that the testing of larger cascade openings would result in a minimum injection mass flow capability, similar to the lower-angled results, and would not continue to allow reduced injection flows.

Most significantly, the injection mass flow ratios required by the prior art configuration make these reversers incompatible with turbofans having bypass ratios greater than BPR=1.50. The core compressors of these engines could not provide the injector flow required. This eliminates applicability of the previous patents to more than 90% of the world's commercial turbofan fleet, the transport aircraft of which have bypass ratios in excess of BPR=1.50.

The lower curve in FIG. 6 is for the BETR fluidic reverser concept, which is different from the prior art descriptions by virtue of the low injector angle, i.e., ø=35°. These results show much lower injection mass flow requirements than for the higher-angled prior art cases, affording compatibility with larger engine bypass ratios. Also, the lower-angled BETR data show that relatively short cascade openings, having the potential for light weight/low volume exhaust systems, are achievable. The reverser effectiveness, i.e., the ratio of reverse thrust to forward thrust (stowed reverser) at the same fan discharge Mach number, is seen to be within the industry state-of-the-art.

The ability to turn fan flow into the cascade opening provides the opportunity to generate reverse thrust. The cascade of turning vanes must be designed to efficiently intercept the fan flow and turn it forward. The reverse thrust performance developed thus far does not reflect any optimization of vane shape, size or distribution within the cascade.

Figure 7:
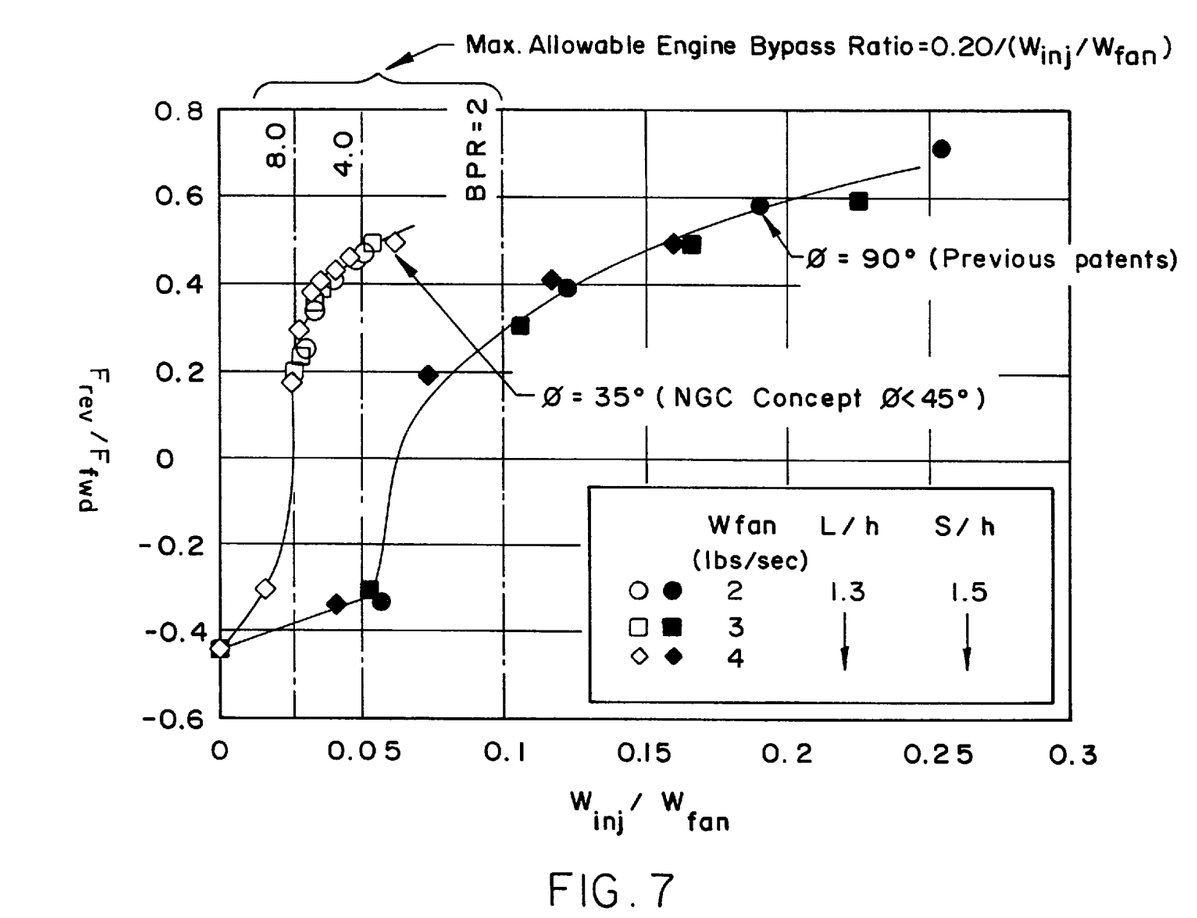
FIG. 7 shows two plots of measured reverse thrust characteristics for a range of simulated fan airflows wherein the reverse thrust ratio, reverse thrust divided by the forward thrust generated with reverser stowed, is plotted against the injector flow ratio, and also shows injector flow ratios that correspond to various maximum allowable engine bypass ratios.

Reverse thrust characteristic—FIG. 7 shows two plots of measured reverse thrust characteristics for a range of simulated fan airflows (Wfan=2 lbs/sec to 4 lbs.sec). The reverse thrust ratio i.e., reverse thrust divided by the forward thrust generated with reverser stowed, is plotted against injector flow ratio. Also shown on FIG. 7 are injector flow ratios that correspond to various maximum allowable engine bypass ratios. A maximum value of $W_{inj}/W_{core}=0.20$ has been used, anticipating improved engine bleed capability for new engines. It is important to note that a minimum reverse thrust ratio of $F_{rev}/F_{fwd}=0.20$ represents a practical lower limit relative to the state-of-the-art. Therefore, since almost all commercial turbofans in the world-wide fleet have bypass ratios in excess of BPR>3, injector flow ratios less than $W_{inj}/W_{fan}<0.075$ must be capable of producing adequate reverse thrust to be useable by the fleet. The test data show that the reverser performance for the configurations defined by the prior art, i.e., ø=90°, cannot meet this requirement.

The curve for ø=35° shows representative data for the present reverser concept. It shows compatibility with turbofan engines having bypass ratios up to BPR=8, and is therefore generally applicable to the worldwide commercial airflow fleet. It is interesting to note the relatively rapid rise in reverse thrust that occurs at low values of injector flow ratio. The reason for this, which occurs at a much lower injector flow for the present inventive concept, is because we are utilizing a forward blowing jet to turn a large stream radially outwardly into a vane cascade. This allows the jet to be designed for integration into modern turbofan engines, i.e., a viable compressor bleed amount and a small length of vane cascade. This configuration generates a large vortex just downstream of the injection jet. This vortex blocks the downstream nozzle duct and deflects the fan flow radially outwardly.

Most significantly, the injection mass flow ratios required by the prior art configuration makes these reversers incompatible with modern turbofans having bypass ratios greater than BPR>3.0. The core compressors of these engines could not provide the injector flow required. This precludes applicability of the prior art approaches to more than 90% of the world's commercial turbofan fleet, the aircraft of which have bypass ratios in excess of BPR=3.0.

Figure 8:
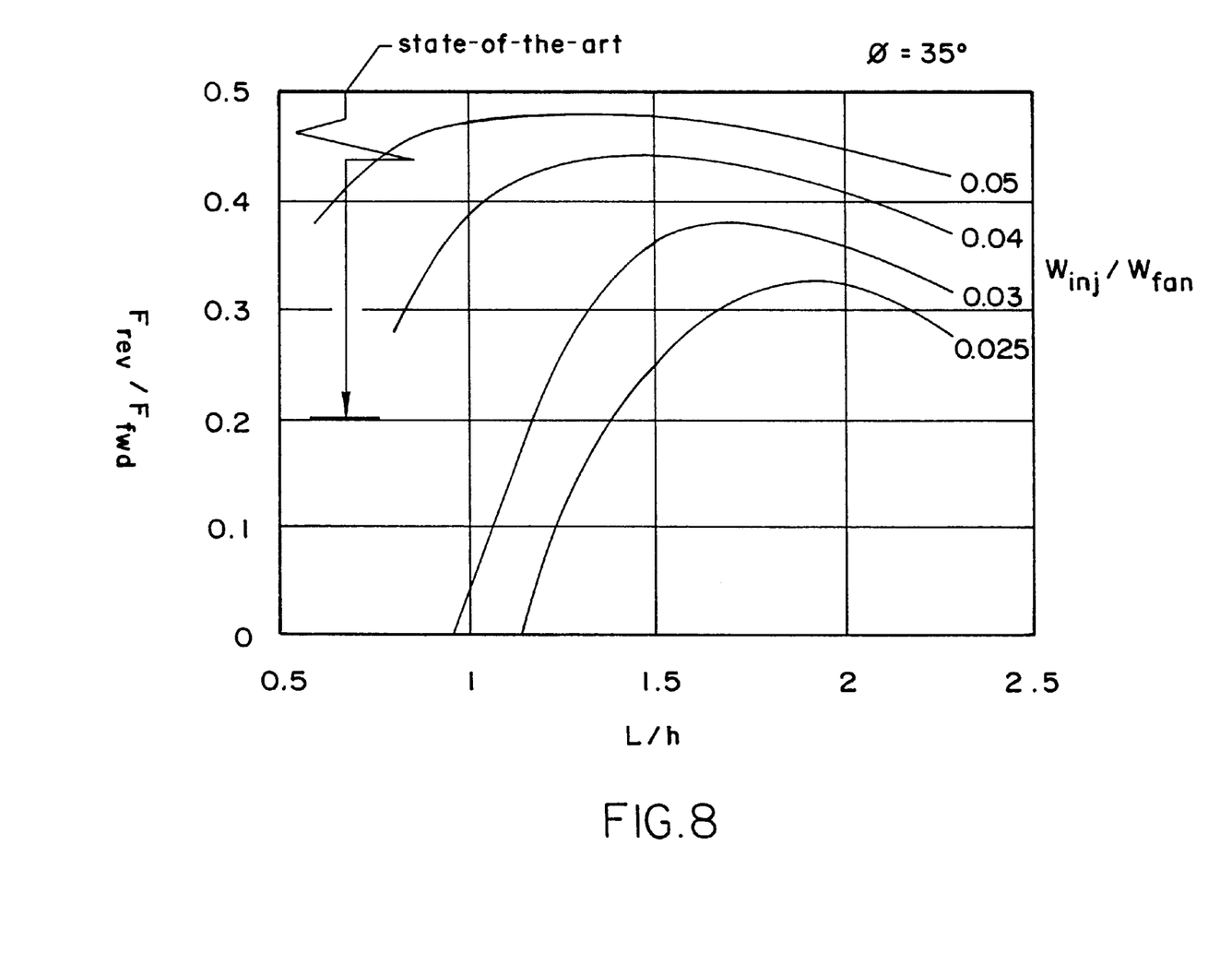
FIG. 8 illustrates data on the injector jet location L/h versus the injector jet flow ratio $W_{inj}/W_{fan}$, and shows that smaller values of injector flow ratio produce maximum reverse thrust at relatively more forward jet locations L/h.

Although the cascade vanes have not been optimally designed yet, it is possible to demonstrate the optimization of the injector jet location, L/h, for any value injector jet flow ratio, $W_{inj}/W_{fan}$. FIG. 8 shows that smaller values of injector flow ratio produce maximum reverse thrust at relatively more forward jet locations L/h. The trends of the plots suggest the possibility of trading reverse thrust levels for smaller amounts of injection flow than shown, using larger values of L/h.

The BETR Concept: The results of research and testing on the present invention have led to define the following concept. A fluidic jet means is utilized for turning the fan discharge flow into a thrust reversing cascade of vanes. The present invention is applicable to turbofan engines having any bypass ratio. The cascade opening, S, may be any length. The injector jet may be located (L) anywhere on the core housing surface, within the axial projection of the cascade opening. The injector jet thickness, t, may be any size compatible with the available core compressor flow and pressure. The injector jet angle, ø, must be less than ø=45°.

While several embodiments and variations of the present invention are described in detail herein, it should be apparent that the disclosure and teachings of the present invention will suggest many alternative designs to those skilled in the art.

What is claimed is:

1. A thrust reverser for an aircraft which does not utilize mechanical blockers comprising:
   a. said aircraft including a podded nacelle having a fan nacelle and a core nacelle, positioned symmetrically around a longitudinal axis, and housing a turbofan engine producing a core flow and a fan exit stream;
   b. an annular slot formed through an outer wall of said fan nacelle for turning forward and discharging said fan exit stream and part of the core flow, said annular slot having a forward surface and an aft surface connecting an inner exterior surface to an outer exterior surface of said outer wall, wherein said forward surface is a convex surface and said aft surface is a concave surface;
   c. a core jet injector means housed in said core nacelle for injecting part of the core flow into said fan exit stream thereby deflecting said fan exit stream and said part of the core flow into said annular slot, wherein said core jet injector means is positioned at an angular position (ø) of less than 45° relative to the longitudinal axis, and facing upstream relative to the fan exit stream, to provide efficient deflection of the fan exit stream; and
   d. a control means for selectively opening and closing said core jet injector means, thereby providing selective thrust reversal.

2. The thrust reverser according to claim 1, wherein said core jet injector means is positioned within the length of the annular slot along the longitudinal axis.

3. The thrust reverser according to claim 2, wherein the core jet injector means is positioned adjacent to the upstream edge of the annular slot, consistent with said convex forward surface, wherein the fan exit stream directed into said annular slot is turned forward and discharged therefrom.

4. The thrust reverser according to claim 1, wherein the turbofan engine is of a modern design having a bypass ratio of flow through the fan to flow through the core of 3.00 or greater.

5. The thrust reverser according to claim 1, wherein the maximum value of the ratio of injector flow to total core flow of $W_{inj}/W_{fan}$ is 0.15, representative of modern engines.

6. The thrust reverser according to claim 1, wherein the angular position (ø) is at substantially 35° relative to the longitudinal axis.

7. The thrust reverser according to claim 1, wherein said control means selectively moves a cover moveably mounted in said outer wall, to selectively open and close said annular slot.

8. The thrust reverser according to claim 7, wherein said control means simultaneously opens said cover and said core jet injector means, thereby injecting said part of the core flow into said fan exit stream and directing said fan exit stream and said part of the core flow into said annular slot for turning forward and discharging to provide reverse thrust.

9. The thrust reverser according to claim 8, wherein a cascade of turning vanes is mounted within said annular slot, said turning vanes being aligned in a directed consistent with said convex forward surface, wherein the fan exit stream directed into said annular slot is turned forward and discharged by said cascade of vanes.

10. The thrust reverser according to claim 1, wherein a cascade of turning vanes is mounted within said annular slot, said turning vanes being aligned in a directed consistent with said convex forward surface, wherein the fan exit stream directed into said annular slot is turned forward and discharged by said cascade of vanes.

11. The thrust reverser according to claim 1, wherein the ratio (t/h) of the jet thickness (t) to the annular height (h) of the fan duct is within the range of 0.015 to 0.035.

* * * * *